United States Patent
Ng et al.

(10) Patent No.: US 11,132,514 B1
(45) Date of Patent: Sep. 28, 2021

(54) APPARATUS AND METHOD FOR APPLYING IMAGE ENCODING RECOGNITION IN NATURAL LANGUAGE PROCESSING

(71) Applicant: Hong Kong Applied Science and Technology Research Institute Company Limited, Hong Kong (HK)

(72) Inventors: Yu Keung Ng, Hong Kong (HK); Yang Liu, Hong Kong (HK); Zhi Bin Lei, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 22 days.

(21) Appl. No.: 16/820,667

(22) Filed: Mar. 16, 2020

(51) Int. Cl.
  *G06F 40/56* (2020.01)
  *G06F 40/30* (2020.01)
  *G06N 3/08* (2006.01)

(52) U.S. Cl.
  CPC .............. *G06F 40/56* (2020.01); *G06F 40/30* (2020.01); *G06N 3/08* (2013.01)

(58) Field of Classification Search
  CPC ............ G06F 40/56; G06F 40/30; G06N 3/08
  See application file for complete search history.

(56) References Cited

U.S. PATENT DOCUMENTS

| | | | |
|---|---|---|---|
| 5,983,237 A * | 11/1999 | Jain | G06F 16/58 |
| 9,547,821 B1 * | 1/2017 | Loreggia | G06N 20/00 |
| 9,690,772 B2 | 6/2017 | Brun et al. | |
| 10,102,453 B1 | 10/2018 | Yang et al. | |
| 2012/0253792 A1 | 10/2012 | Bespalov et al. | |
| 2017/0109838 A1 * | 4/2017 | Byron | G06Q 50/01 |
| 2018/0349158 A1 * | 12/2018 | Swersky | G06F 9/45516 |
| 2019/0108446 A1 * | 4/2019 | Lyu | G06K 9/46 |

(Continued)

FOREIGN PATENT DOCUMENTS

| | | |
|---|---|---|
| CN | 106372107 A | 2/2017 |
| CN | 108345633 A | 7/2018 |

(Continued)

OTHER PUBLICATIONS

International Search Report of corresponding PCT Patent Application No. PCT/CN2020/080514 dated Dec. 18, 2020.

*Primary Examiner* — Kevin Ky
(74) *Attorney, Agent, or Firm* — Idea Intellectual Limited; Margaret A. Burke; Sam T. Yip (57) ABSTRACT

A method for applying image encoding recognition in the execution of natural language processing (NLP) tasks, comprising the processing steps as follows. A sentence from a textual source is extracted by an NLP-based feature extractor. A word vector is generated in response to the sentence by the NLP-based feature extractor. The word vector is converted into a feature vector $\vec{b}$ by the NLP-based feature extractor, in which the feature vector $\vec{b}$ satisfies $\vec{b} \in \mathbb{R}^m$ and the parameter m is a positive integer. The feature vector is transformed into an image set having a plurality of two-dimensional images by a transformer. The image set is fed to a neural network to execute image recognition by a processor, so as to analyze the sentence.

18 Claims, 8 Drawing Sheets

(56) References Cited

U.S. PATENT DOCUMENTS

| | | | |
|---|---|---|---|
| 2019/0156122 A1* | 5/2019 | Lu | G06F 16/56 |
| 2019/0156156 A1 | 5/2019 | Tang | |
| 2020/0026908 A1* | 1/2020 | Henderson | G06K 9/6267 |
| 2020/0028686 A1* | 1/2020 | Karabina | G06K 9/6277 |
| 2020/0042838 A1* | 2/2020 | Trim | G06K 9/624 |
| 2020/0126584 A1* | 4/2020 | Huang | G10L 15/1815 |
| 2020/0195779 A1* | 6/2020 | Weisman | G10L 15/1807 |
| 2020/0218857 A1* | 7/2020 | Shen | G16H 20/00 |
| 2020/0327639 A1* | 10/2020 | Walvoord | G06N 3/0454 |
| 2020/0341974 A1* | 10/2020 | Bowden, Jr. | G06F 16/3347 |
| 2021/0034993 A1* | 2/2021 | Fan | G06Q 50/00 |
| 2021/0089571 A1* | 3/2021 | Perone | G06F 40/30 |
| 2021/0109966 A1* | 4/2021 | Ayush | H04N 19/46 |
| 2021/0158226 A1* | 5/2021 | Niwa | G06F 17/18 |

FOREIGN PATENT DOCUMENTS

| | | |
|---|---|---|
| CN | 109829306 A | 5/2019 |
| WO | 2017162134 A1 | 9/2017 |

\* cited by examiner

APPARATUS AND METHOD FOR APPLYING IMAGE ENCODING RECOGNITION IN NATURAL LANGUAGE PROCESSING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of natural language process (NLP). More specifically, the present invention relates to techniques of applying image encoding recognition to handle NLP tasks.

BACKGROUND OF THE INVENTION

Natural language processing (NLP) is a technology used in aiding computers to analyze, understand, and derive meanings from human language in a smart and useful way. NLP has become an important research topic in recent years. Applications of NLP help humans to process massive electronic documents including review of comments, news reports, etc., and interact with humans in ways such as electronic personal assistant and social chatbot. Yes, the majority of the applications of NLP are related to information retrieval, articles auto-summarization, and polarity analysis (i.e. positive/negative classification).

Machine learning recently has contributed much to the NLP technology. Machine learning is able to generalize and handle novel cases. In a machine learning model, if a case resembles something the model has seen before, the model can use its "learning" to evaluate the case. With machine learning, the goal is to create a system in which the model can be continuously improved.

A machine learning model with text analytics by NLP is able to identify aspects of text, so as to understand meaning of text documents. In other words, the model can be provided to accelerate and automate the underlying text analytics functions, such that unstructured text is turned into useable data and insights.

However, current development of machine learning models are based on the linguistic model, which have significant performance limitations. For example, some models analyze a target sentence structure in a way like subjects-words-objects in a sentence to understand its meaning. These types of analysis are specific to particular languages and cannot be generalized for other different languages; they also exhibit low accuracy in handling complex sentences. Therefore, there is a need in the art for a new approach for a machine learning model with NLP that can process and turn massive electronic documents into useable data without missing hidden features, in turn improving accuracy.

SUMMARY OF THE INVENTION

The present invention provides a method and an apparatus for applying image encoding recognition in the execution of natural language processing (NLP) tasks. In accordance to one aspect of the present invention, the method comprises the process steps as follows. A sentence from a textual source is extracted by an NLP-based feature extractor. A word vector is generated in response to the sentence by the NLP-based feature extractor. The word vector is converted into a feature vector $\vec{b}$ by the NLP-based feature extractor, in which the feature vector $\vec{b}$ satisfies $\vec{b} \in \mathbb{R}^m$ and the parameter m is a positive integer. The feature vector is transformed into an image set having a plurality of two-dimensional images by a transformer. The image set is input into a neural network to execute image recognition by a processor, so as to analyze the sentence.

In accordance to another aspect of the present invention, the apparatus includes an NLP-based feature extractor, a transformer, and a processor. The NLP-based feature extractor is configured to extract a sentence from a textual source, configured to generate a word vector in response to the sentence, and configured to convert the word vector into a feature vector $\vec{b}$ such that $\vec{b} \in \mathbb{R}^m$ where the parameter m is a positive integer. The transformer is configured to transform the feature vector into an image set having a plurality of two-dimensional images. The processor is configured to input the image set into a neural network to execute image recognition, so as to analyze the sentence.

In various embodiments, the method further includes a step of modifying resolution of the images by a modifier. The modifying resolution includes an up-sampling process and performing feature enhancement.

The advantages of the present invention include: (1) Since a textual source is converted to a feature vector and then transformed into an image set for recognition, higher accuracy for an NLP task result is achieved. The reason is that the image set having the two-dimensional images contains richer information and unraveled previously-hidden features of the feature vector, so as to give a more complete description of the feature vector. (2) The NLP task, such as polarity classification, can be achieved via image recognition, in which the image recognition can be configured and executed based on one of many relatively more mature imaging-based models, thereby enhancing performance and accuracy of the results for the NLP task. (3) The image set can be further modified. The modification includes up-sampling the image set and performing feature enhancement to the image set. The modification to the image set benefits by reorganizing image features such that a simple image classifier can be used to classifier the image and improve the classification accuracy.

BRIEF DESCRIPTION OF THE DRAWINGS

Embodiments of the invention are described in more detail hereinafter with reference to the drawings, in which.

DETAILED DESCRIPTION

In the following description, methods and apparatuses for applying image encoding recognition to handle natural language processing (NLP) tasks, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
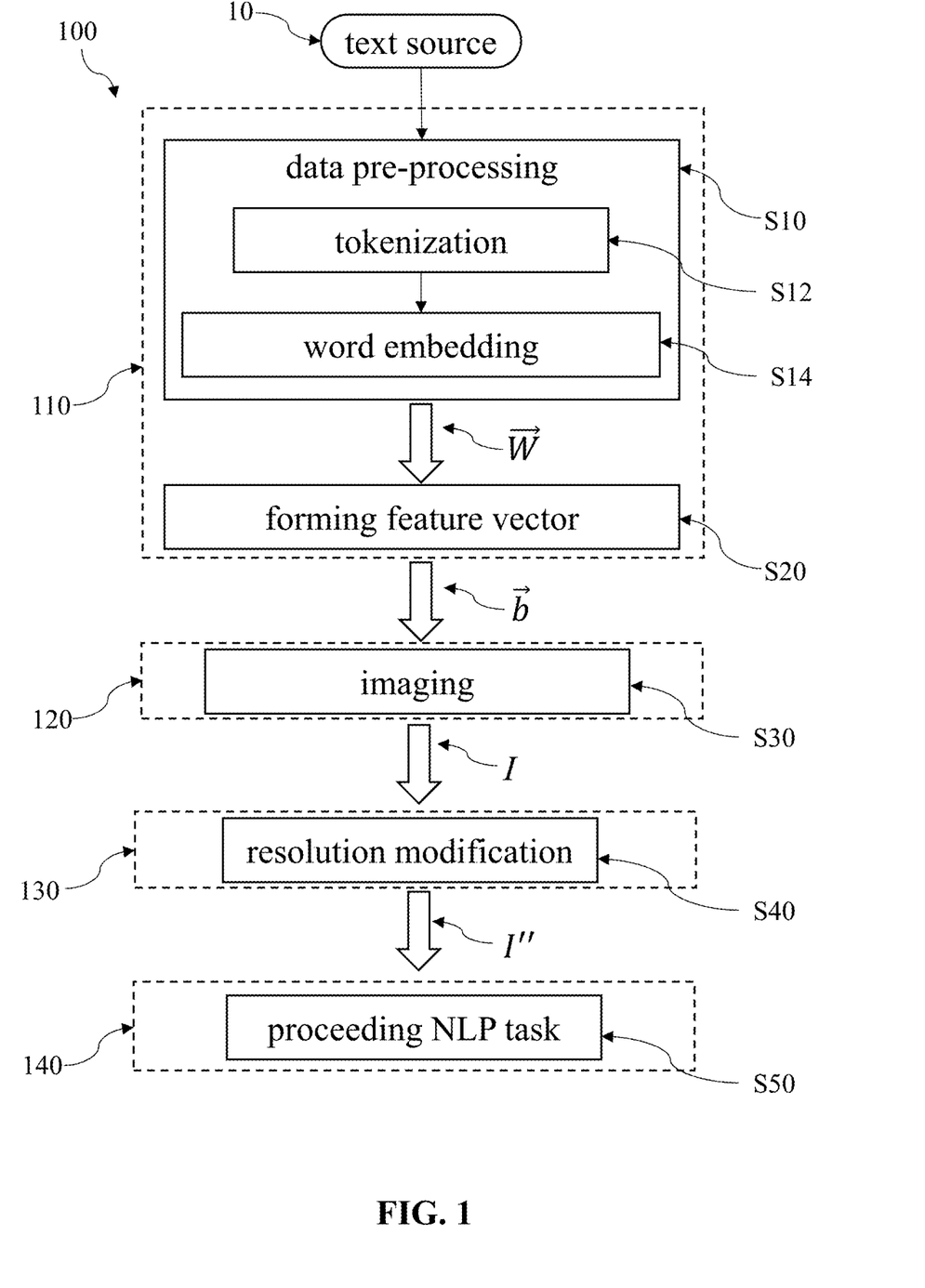
FIG. 1 depicts a simplified logical structural and dataflow diagram of a method for applying image encoding recognition to handle NLP tasks by an NLP-based recognition system in accordance with various embodiments of the present invention.

FIG. 1 depicts a simplified logical structural and dataflow diagram of a method for applying image encoding recognition to handle NLP tasks by an NLP-based recognition system 100 in accordance with various embodiments of the present invention. The NLP-based recognition system 100 includes a feature extractor 110, a transformer 120, a modifier 130, and a processor 140, which are configure to execute different stages of the method. The NLP-based recognition system 100 executes a method comprising stages S10, S20, S30, and S40. The stage S10 is data pre-processing executed by a feature extractor 110; stage S20 is forming feature vector executed by the feature extractor 110; stage S30 is imaging executed by a transformer 120; stage S40 is resolution modification executed by a modifier 130; and stage S50 is executing NLP task executed by the processor 140.

In various embodiments, the NLP-based recognition system 100 may be implemented by an electronic device, such as computer, laptop, cell phone, tablet, or other portable devices. The components of the NLP-based recognition system 100 can be designed based on machine learning or deep learning models, some of which serve to automatically discover the representatives needed for feature detection or classification from raw data. Accordingly, the components of the NLP-based recognition system 100 may contain a series of neural networks layers, and each layer is configured to learn a representation from its input data and then result thereof is subsequently used for classification/regression. Specifically, according to a predetermined purpose, what kind of knowledges to be learned by the model can be determined during training or learning, such that the model become in tune with those knowledge bases on data fed to the model.

The method is performed on a textual source 10 to execute an NLP task. In various embodiments, the NLP task may be a polarity analysis, a text composition, or the likes. For the application of the NLP task in the polarity analysis, the output of the method is a positive/negative classification; and the input textual source 10 may contain at least one sentence, such as a comment, a review, or a note with a positive/negative meaning. For example, in a case of reviewing a restaurant, the textual source 10 may contain a positive review as "service is friendly and inviting" or a negative review as "this restaurant suffers from not trying hard enough".

In the exemplary illustration of FIG. 1, the textual source 10 is fed to the feature extractor 110 to begin with stage S10. The feature extractor 110 is an NLP-based feature extractor designed as being available to machine training. At design time, the feature extractor 110 is trained with a training dataset containing words and characters of a selected language, in which the training dataset may be a word vector dictionary, millions of raw data and text documents, or the likes. During training, the feature extractor 110 is trained to generate a vector representation by mapping words or phrases from a set to vectors of real numbers. Thus, the feature extractor 110 is able to extract common features among word vectors from a sentence to form a vector representation of it, thereby obtaining word vectors from the sentence.

In stage S10, the data pre-processing to the textual source 10 includes stages S12 and S14, which are tokenization and word embedding, respectively.

In stage S12, the feature extractor 110 is configured to execute a tokenization, so as to extract and tokenize all words in a sentence from the textual source 10. Specifically, tokenization is a process by which big quantity of the sentence of the textual source 10 is divided into smaller parts, which can be called tokens.

In stage S14, the feature extractor 110 is configured to embed each word of the sentence into a vector, so as to generate a word vector $\vec{W}$ in response to the sentence. For example, if the textual source 10 were a sentence such as "service is friendly and inviting", a set of the word vectors $\vec{W}$ with respect to the textual source 10 is formed as $\vec{W} = \{\vec{v}_1, \vec{v}_2, \vec{v}_3, \vec{v}_4, \vec{v}_5\}$, where $\vec{v}_i$ is the word vector serving as a natural language element (NLE).

After the word embedding of stage S14, stage S20 continues to process the word vectors $\vec{W}$, thereby forming a feature vector $\vec{b}$. In stage S20, the formation of the feature vector $\vec{b}$ is executed by the feature extractor 110. In various embodiments, the training of the feature extractor 110 further constructs a feature vector database therein. The feature vector database may be implemented in one or more databases and/or file systems, local or remote to the feature extractor's run-time execution computing devices and/or servers. In various embodiments, the training for constructing the feature vector database is performed by using one or more neural networks, such as long short-term memory (LSTM), gated recurrent unit (GRU), or combinations thereof. Such neural network is useful in name-entity recognition and time series pattern analysis. For example, a LSTM neural network can be used for classifying and making predictions based on the real-time normal discrepancy data (or the normal discrepancy training data set during training). As such, the feature extractor 110 is able to filter out the common features of the word vectors $\vec{W}$ prepared in stage S14 and convert them into a single feature vector, $\vec{b}$, which satisfies $\vec{b} \in \mathbb{R}^m$, where m is a positive integer. In this regard, "$\vec{b} \in \mathbb{R}^m$" means the feature vector $\vec{b}$ is a m-dimension vector extracted from the word vectors of the sentence. The value of m is related to the information shared by the word vectors. More specifically, in an NLP task regarding polarity, the objective is to understand the polarity of a sentence. To achieve it, using word vectors of the sentence to generate a feature vector is an important means. Since polarity feature only occupies a small portion of all features in the word vectors, the dimension of the corresponding feature vector can be small. For example, if a 100-dimension word vector dictionary is used to perform word embedding, a 20-dimension feature vector is enough to represent the polarity information. Moreover, if a more complex task is to be processed, a larger m should be used.

After the formation of the feature vector $\vec{b}$, stage S30 is executed to generate one or more images by an imaging process. In the imaging process, the one or more images are formed by transforming the feature vector $\vec{b}$ prepared in stage S20. Specifically, the feature vector $\vec{b}$ serves as an input source to the transformer 120, and then the transformer 120 outputs one or more images. In this regard, the transformer 120 is an NLP-based transformer which is trained to be able to transform a feature vector into an image or a set of images. In some embodiment, the training of the transformer 120 involves forming a matrix from an input vector, in which the formed matrix can be treated as an image such that reasonable guides can be made to construct a transformation model for machine learning. Furthermore, information stored in the transformation model is related to training data. For example, as the NLP task is the positive/negative classification, the information stored in the transformation model is polarity analysis.

Furthermore, the NLP base for the transformer 120 means the transformer 120 depends on a selected language and contains transform vectors $\{d_i\}_{i=1}^{q}$, where $\vec{d}_i \in \mathbb{R}^n$, the parameter i is a positive integer from 1; n is a positive integer; each of $\vec{d}_i$ is orthogonal to another one; and the parameter q represents the number of channels for images. In various embodiments, the parameter q is dependent of a selected language and is set the same as the number of parts of speech of the selected language. For example, if the transformer 120 is applied to an English-based model, the parameter q is the number 8 due to English having eight parts of speech. In this regard, the number of $\vec{d}_i$ is the same as the number of images to be output (i.e. "i" number of $\vec{d}_i$ generate "i" number of images). Specifically, with the feature vector $\vec{b}$, an image set I can be obtained by computing calculation of $I = [\vec{b} \vec{d}_1^T, \vec{b} \vec{d}_2^T, \ldots, \vec{b} \vec{d}_q^T] \in \mathbb{R}^{q \times m \times n}$, where $\vec{d}_i^T$ is the transpose of $\vec{d}_i$. For the image set I, the dimensions thereof are related. That is, with the feature vector $\vec{b} \in \mathbb{R}^m$, each of the transform vectors $\vec{d}_i \in \mathbb{R}^n$, and the q number of the transform vectors $\{\vec{d}_i\}_{i=1}^{q}$, it results in the formation of the image set I such that $I \in \mathbb{R}^{q \times m \times n}$ and having a plurality of two-dimensional images.

Figure 2A:
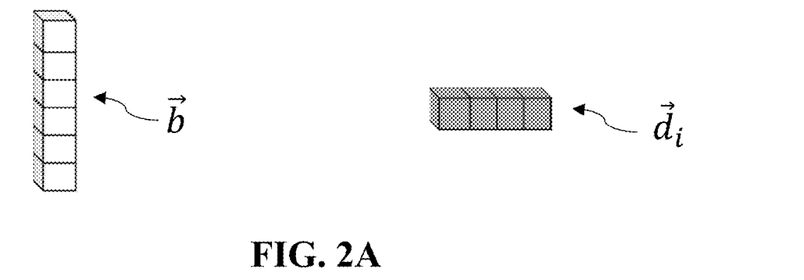
FIG. 2A depicts a first schematic diagram illustrating an imaging process in accordance with various embodiments of the present invention.
Figure 2B:
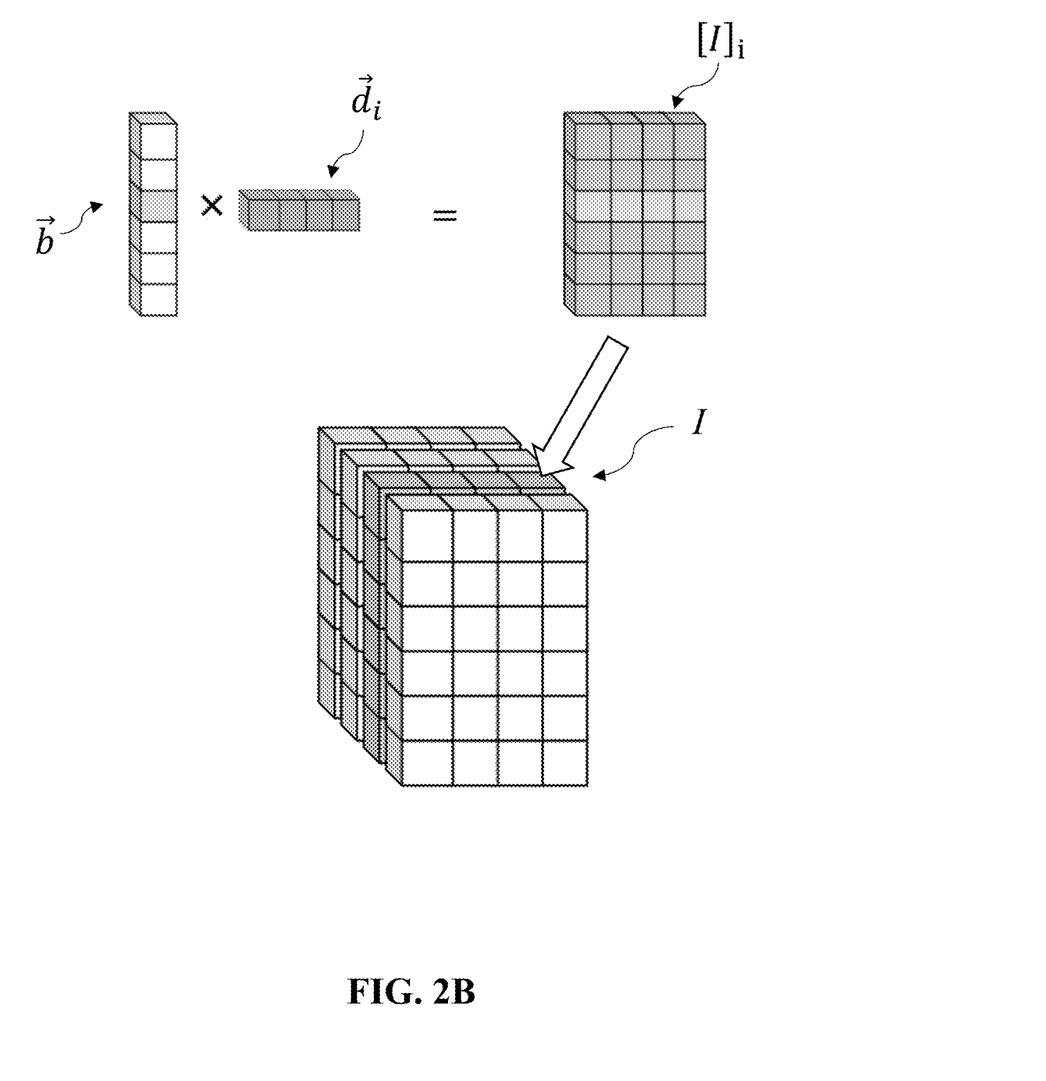
FIG. 2B depicts a second schematic diagram illustrating the imaging process.

To illustrate, as shown in FIG. 2A, the feature vector $\vec{b}$ prepared in stage S20 and the transform vector $\vec{d}_i$ prepared in stage S30 are illustrated as bars with blocks. And as shown in FIG. 2B, a two-dimensional image $[I]_i$ is formed by the product of the feature vector $\vec{b}$ and the transform vector $\vec{d}_i$. As afore-described, "i" number of $\vec{d}_i$ generate "i" number of images, so multiple images are formed as the image set I.

Figure 3:
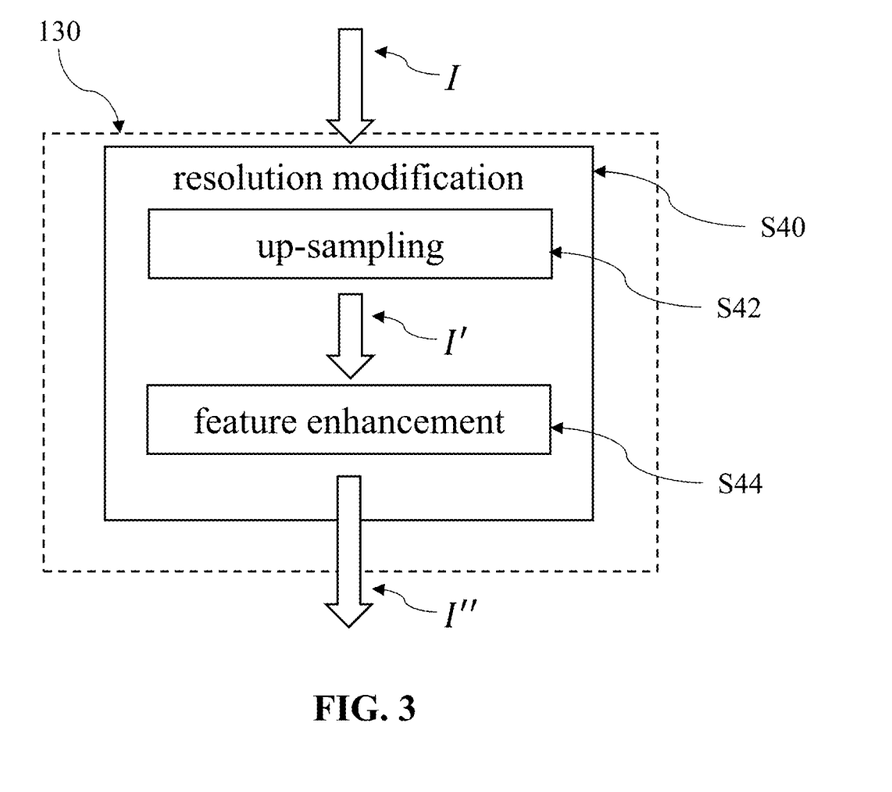
FIG. 3 depicts a simplified logical structural and dataflow diagram of the resolution modification process in accordance with various embodiments of the present invention.

Referring to FIGS. 1 and 3. After the imaging process, stage S40 is executed to perform a resolution modification on the formed images prepared in stage S30, comprising stages S42 and S44 for up-sampling and feature enhancement respectively.

In stage S42, the image set/prepared in stage S30 is up-sampled. The image set I is up-sampled resulting in I', such that $I \in \mathbb{R}^{q \times m \times n}$ and $I' \in \mathbb{R}^{q \times m \times t}$ where the parameter t is a positive integer greater than the parameter n. For example, the parameter t can be twice of the parameter n, and thus the up-sampled image I' satisfies $I' \in \mathbb{R}^{q \times m \times 2n}$. In some embodiments, the up-sampling (i.e. increasing the resolution) is performed in both dimensions, such that the up-sampled image I' satisfies $I' \in \mathbb{R}^{q \times p \times t}$, where p>m and t>n.

Figure 4:
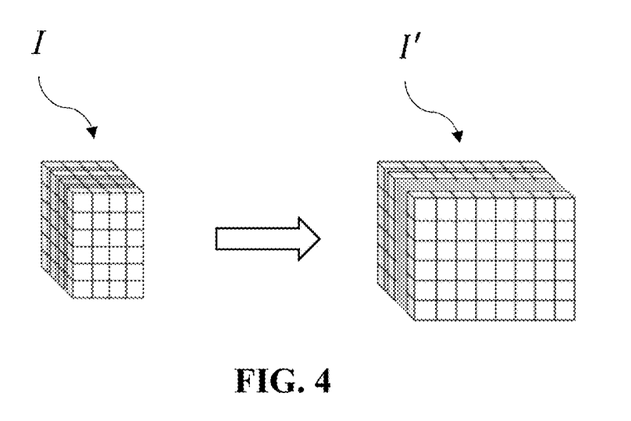
FIG. 4 depicts a schematic diagram illustrating the up-sampling of an image set in accordance with various embodiments of the present invention.
Figure 5:
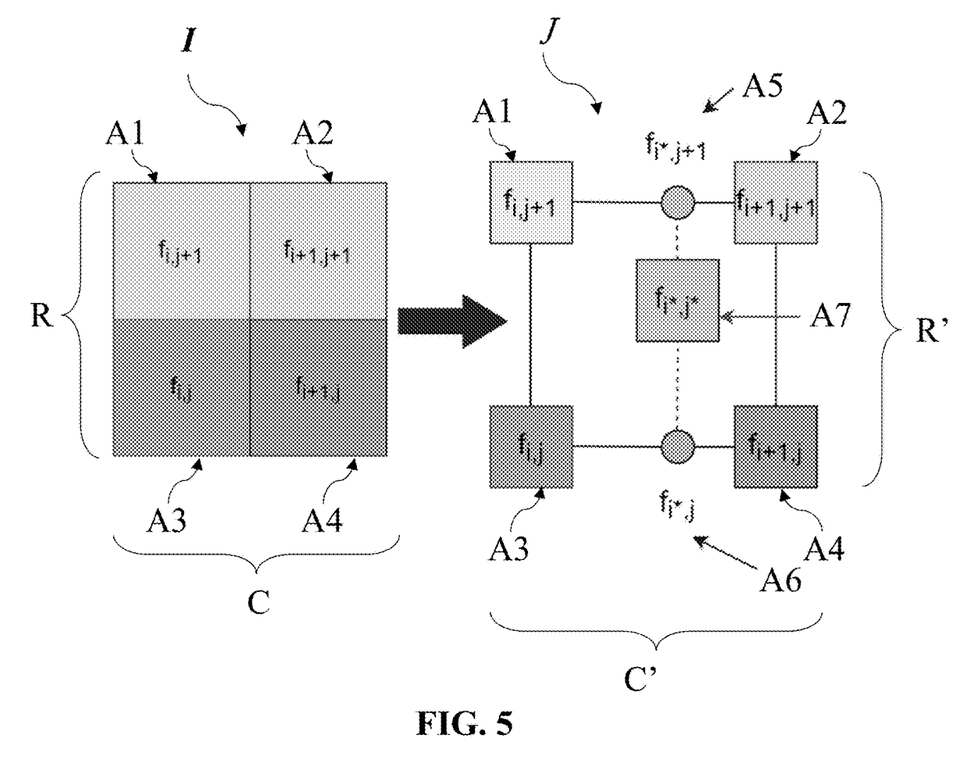
FIG. 5 is a schematic diagram of resampling through interpolation in accordance with various embodiments of the present invention.

FIG. 4 illustrates the up-sampling of the image set I. In various embodiments, the up-sampling can be achieved by interpolation, such as resampling through interpolation. Specifically, as shown in FIG. 5, the original image data I (i.e. the image set I prepared in stage S30, $I \in \mathbb{R}^{q \times m \times n}$) as a R×C image, and the goal is to resize the original image data to R'×C', called the new image data J (i.e. the up-sampled image, $I \in \mathbb{R}^{q \times m \times t}$). The original image data I has four points A1 $[f_{i,j+1}]$, A2 $[f_{i+1,j+1}]$, A3 $[f_{i,j}]$, and A4 $[f_{i+1,j}]$. During the up-sampling, a linear interpolation approach is applied, such that two points A5 $[f_{i*,j+1}]$ and A6 $[f_{i*,j*}]$ are obtained by the linear interpolation between the points A1 $[f_{i,j+1}]$ and A2 $[f_{i+1,j+1}]$ and between A3 $[f_{i,j}]$ and A4 $[f_{i+1,j}]$, respectively. Next, a point A7 $[f_{i*,j*}]$ is obtained by the linear interpolation between the points A5 $[f_{i*,j+1}]$ and A6 $[f_{i*,j*}]$. As such, the new image data J having points A1-A7 is obtained.

Referring to FIG. 3 again. The image set I' is then transmitted to stage S44 following stage S42 to execute the feature enhancement, which can be done by an activation function, on the image set I', thereby producing a feature-enhanced image set I".

Figure 6:
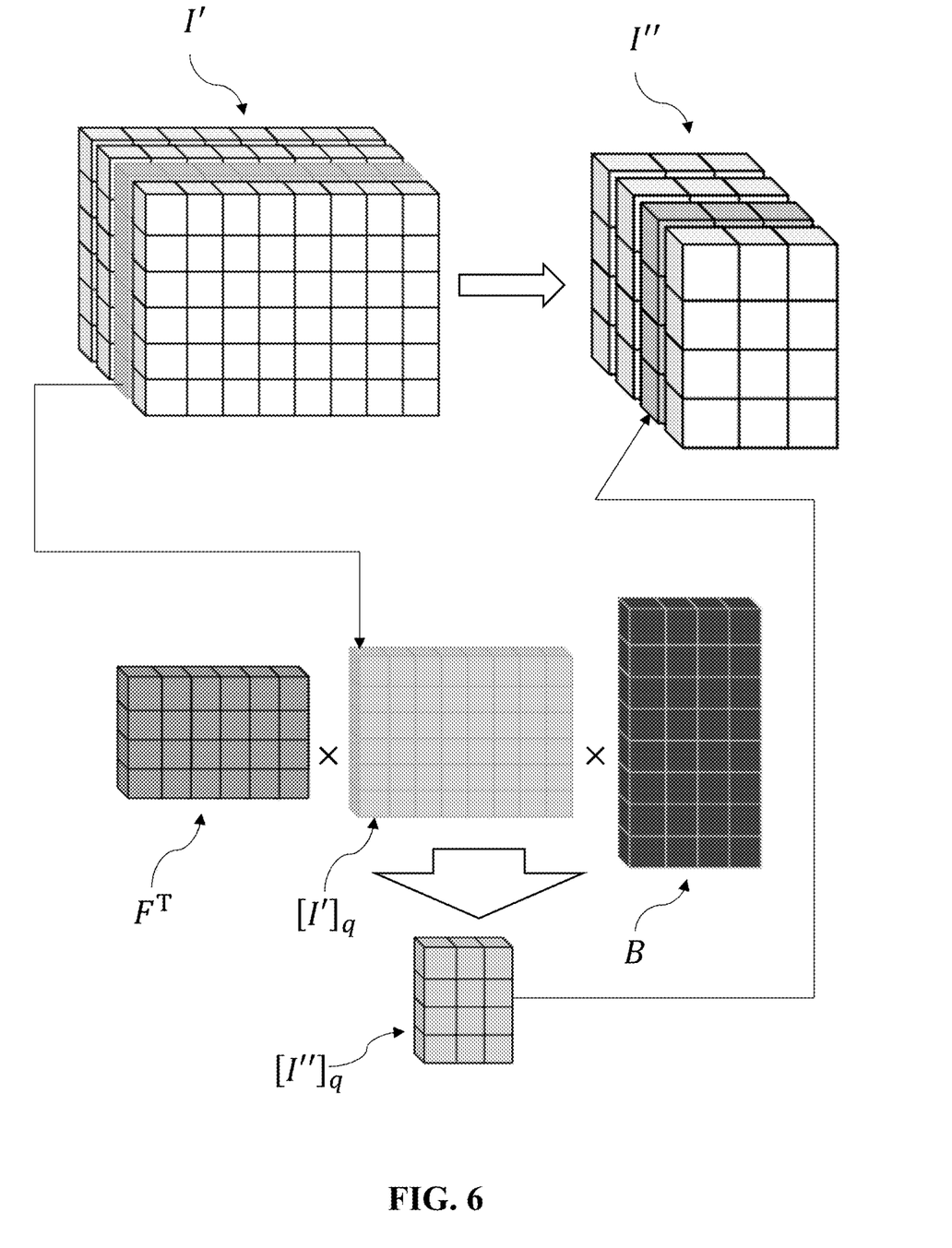
FIG. 6 is a schematic diagram illustrating a feature enhancement in accordance with various embodiments of the present invention.

To illustrate, FIG. 6 is a schematic diagram of the feature enhancement in accordance with various embodiments of the present invention. Each image of the image set I' is introduced into the activation function, such that image $[I'']_q$ (a.k.a. the feature-enhanced image set I") is obtained. For example, image $[I']_q$ of the image set I' is first multiplied by matrices F and B, where F and B are orthogonal matrices. This operation is developed in accordance with the principle of Singular Value Decomposition (SVD). In SVD, a matrix A decomposes in $U \times S \times V^T$, in which matrices U and V are orthogonal matrices and matrix S is a diagonal matrix whose diagonal values are the singular values of matrix A. Matrix S carries the characteristic features of matrix A in a better representation. Equivalently, matrix S is found by multiplying matrix A with matrices U and V (i.e. $S = U^T \times A \times V$). Therefore, the features of an image $[I']_q$ is rearranged by multiplying suitable orthogonal matrices in the front and back (i.e. $F^T \times [I']_q \times B = [I'']_q$). In various embodiments, after this operation, the features of $[I'']_q$ if further enhanced by applying an activation on $[I'']_q$. In various embodiments, these two operations are repeat several times to achieve better features enhancement. As a result, the image set I' is rearranged into a feature-enhanced image set I" for which $I'' \in \mathbb{R}^{q \times r \times s}$; where the parameter r is a positive integer equal to or different from the parameter m; and the parameter s is a positive integer equal to or different from the parameters n and t. Therefore, the image set I' if converted into characteristic form for NLP purpose, such as positive/negative classification in polarity analysis.

In various embodiments, if the image set I prepared in stage S30 has high enough resolution (i.e. the image set I has clear features that can be resolved by the machine learning), stages S42 and S44 can be skipped. In other words, stage S40 is executed when the resolution of the image set I prepared in stage S30 is not high enough for information representation. In view of the image resolution modification, the modified features are represented in another way and the information content are the same as before, and no additional information is added. Herein, the phrase "the modified features are represented in another way" means important information in a data set can be captured much more effectively than the original features, thereby increasing both accuracy and structural understanding in high-dimensional problems in modifying image quality within losing information embedded therein.

In various embodiments, only stage S42 is executed but stage S44 is omitted. That is, stage S42 is one of the conditions for executing stage S44. In view of this, the reason for executing stage S44 is that some negative side effects may accompany the image resolution modification. For example, blurred image may occur. Thus, the feature enhancement of stage S44 may be executed to compensate for such negative side effects. In various embodiments, to compensate for the side effects, other proper approach may be selected by machine learning.

Figure 7:
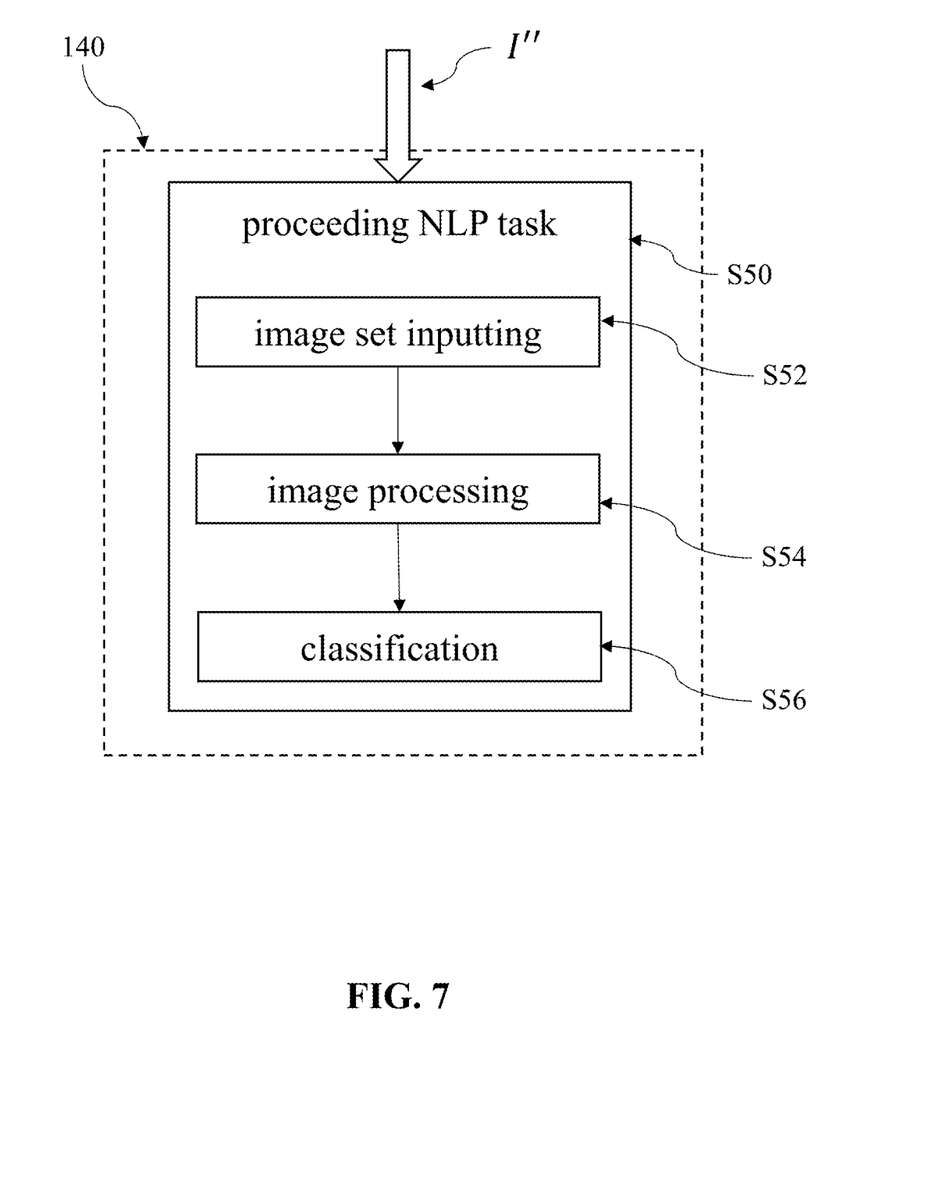
FIG. 7 illustrates a simplified logical structural and dataflow diagram of executing an NLP task in accordance with various embodiments of the present invention.

Referring to FIGS. 1 and 7. Stage S50 is executed to process an NLP task. As afore described, the NLP task in the exemplary illustration of FIGS. 1 and 7 is polarity classification, and hence the processor 140 can act as a classifier. That is, for the purpose of the polarity classification, the processor 140 can be trained to become an image classifier by feeding images in an approach of machine learning, thereby finding a result for the NLP task according to the image set I". The stage S50 includes stages S52, S54, and S56, which are image set inputting, image processing, and classification, respectively.

In stage S52, the image set I" is transmitted to the processor 140. In the present embodiment, the resolution of the image set I prepared in stage S30 is modified by both stages S42 and S44, and thus stage S44 is taken as an image source to the processor 140. In other embodiments, stage S30 or S42 may be taken as an image source to the processor 140 (i.e. in the cases of skipping stage S40 or skipping stage S42).

In stage S54, the image set of stage S52 is input into a neural network to execute an image recognition by extracting features from the images. Such neural network can be convolutional neural network (CNN), fully convolutional network (FCN), multilayer perceptron (MLP), or combinations thereof. That is, the neural network used for image classification can be based on one of many relatively mature imaging-based models. As such, with the image recognition executed by the processor 140, the NLP task with analyzing the sentence for the polarity classification can be achieved by image classification, which will be advantageous to improve accuracy in polarity classification for the sentence.

Further, the image set having two-dimensional images contains richer information so that higher accuracy can be achieved. In this regard, the two-dimensional images unravel hidden features of the feature vector to give a more complete description of the feature vector, and therefore using the transformed image set can reveal more information of the textual source 10 than only using the word vectors. Generally speaking, traditional approaches for only processing word vector, which may be compressed, into an NLP result would miss a lot of hidden features in the word vector.

In stage S56, the processor 140 outputs the result of the polarity classification, which may show if the textual source 10 is positive or negative polarity. Briefly, once a comment (or a review/note) is input into the NLP-based recognition system 100, the comment is transformed into an image set and then polarity of the comment can be classified according to the image set, thereby showing the comment is positive or negative.

A practical example for polarity classification is provided as follows. There are reviews of a restaurant from a thousand individuals, and each of the reviews is either a positive or negative sentence. The reviews are input into the NLP-based recognition system 100 for polarity classification. For the NLP-based recognition system 100, train data to test ratio is set as 0.2, which means 800 sentences are used for training and 200 sentences are used for testing. The training is performed several times with different cross-validation data sets to ensure no overfitting occurs. Here, "overfitting" means the result corresponds too closely or exactly to a particular set of data and therefore fails to fit additional data or to predict future observations reliably. Moreover, the "overfitting" may be resulted from the processing model containing more parameters than that can be justified by data. The result of this example provides high accuracy and high F1 score, and the number of model training parameters required is reduced.

Figure 8:
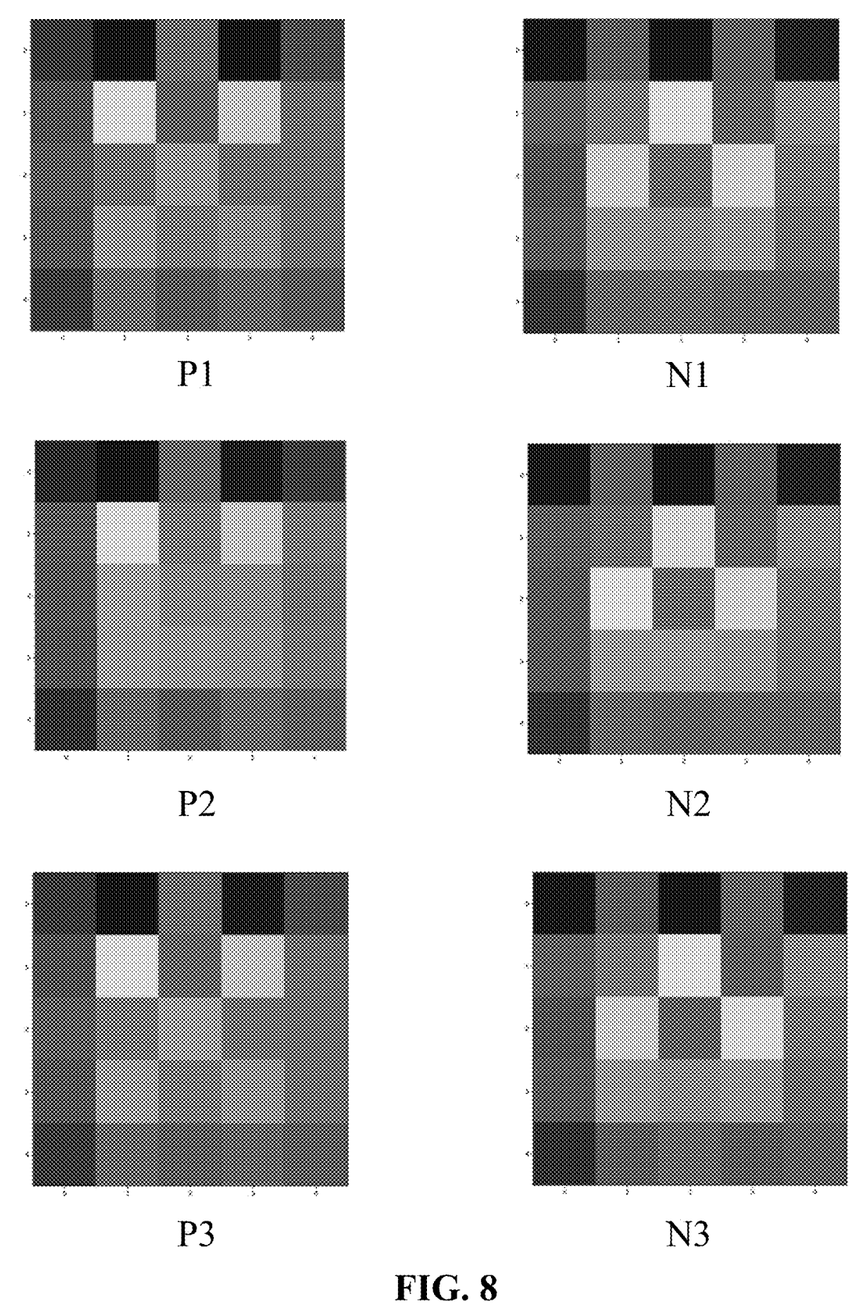
FIG. 8 shows the exemplary patterns generated using a method for image encoding recognition in accordance with various embodiments of the present invention.

Some of the image sets transformed from feature vectors by using the afore-described manner are shown in FIG. 8. Each of patterns P1-P3 and N1-N3 is constructed by an image set and is in a two-dimensional form.

Patterns P1-P3 correspond to three different comments with positive polarity. For example, pattern P1 is transformed from a feature vector that is generated in response to a sentence "my boyfriend and I sat at the bar and had a completely delightful experience"; pattern P2 is transformed from a feature vector that is generated in response to a sentence "he also came back to check on us regularly excellent service; and pattern P3 is transformed from a feature vector that is generated in response to a sentence "service is friendly and inviting".

Patterns N1-N3 correspond to three different comments with negative polarity. For example, pattern N1 is transformed from a feature vector that is generated in response to a sentence "I've had better not only from dedicated boba tea spots but even from jenni pho"; pattern N2 is transformed from a feature vector that is generated in response to a sentence "third the cheese on my friend's burger was cold"; and pattern N3 is transformed from a feature vector that is generated in response to a sentence "I think this restaurant suffers from not trying hard enough".

Patterns P1-P3 that are corresponding to the positive polarity comments have similar features which are different from those of patterns N1-N3 corresponding to the negative polarity comments. Such differences between the positive polarity patterns and the negative polarity patterns are identifiable for machine learning using at least one neural network, so as to achieve polarity classification by image classification. Although patterns P1-P3 and N1-N3 are shown in grayscale, it should be understood that these patterns are exemplary and may be presented in multi-colors in other real-life cases.

Figure 9:
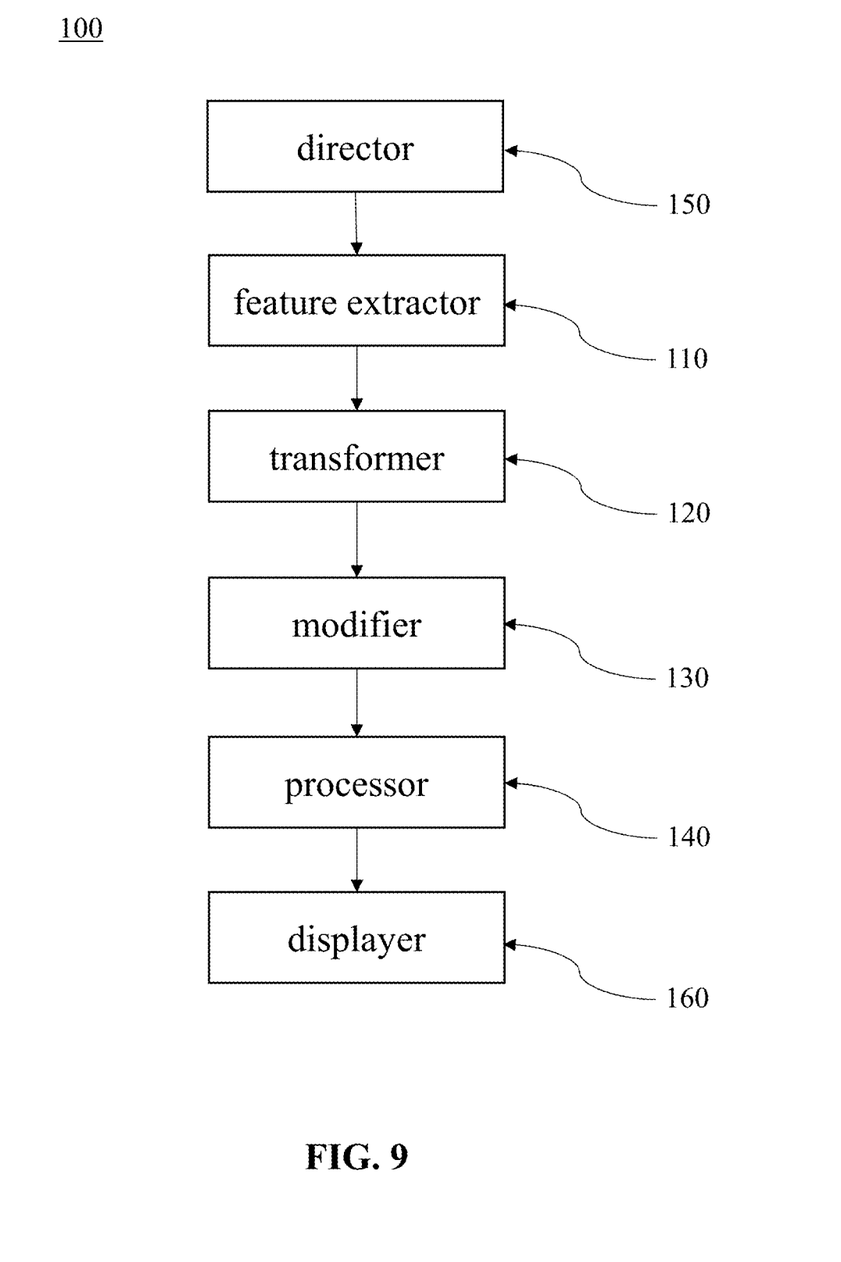
FIG. 9 depicts a block diagram of configuration of an NLP-based recognition system in accordance with various embodiments of the present invention.

Referring to FIG. 9. An NLP-based recognition system 100 may comprises a feature extractor 110, a transformer 120, a modifier 130, and a processor 140. The NLP-based recognition system 100 may further include a director 150 and a displayer 160. The director 150 is configured to link to a target textual source and further receive comments of the textual source, so as to input the comments into the feature extractor 110. In various embodiments, the target textual source may be found from a website, a software, a bulletin board system (BBS), an App, or other suitable source. After the NLP-based recognition system 100 processes the textual source by the feature extractor 110, the transformer 120, the modifier 130, and the processor 140 as the afore-described manner, a classification result of an NLP task can be transmitted from the processor 140 to the displayer 160, so as to physically and visually show the classification result. For example, a user can set the NLP-based recognition system 100 to execute an NLP task for polarity classification by linking a target textual source containing a lot of comments/reviews via the director 150. Then, the displayer 160 of the NLP-based recognition system 100 can show a classification result of the polarity classification, so as to inform the user that the polarity of the comment/review is positive or negative and that the number of the positive and negative comments/reviews.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for applying image encoding recognition to natural language processing (NLP), comprising:
    extracting a sentence from a textual source by an NLP-based feature extractor;
    generating a word vector in response to the sentence by the NLP-based feature extractor;
    converting the word vector into a feature vector $\vec{b}$ by the NLP-based feature extractor, wherein the feature vector $\vec{b}$ satisfies $\vec{b} \in \mathbb{R}^m$ and the parameter m is a positive integer;
    transforming the feature vector $\vec{b}$ into an image set having a plurality of two-dimensional images by a transformer; and
    inputting the image set into a neural network to perform image recognition on the image set by a processor to generate an analytical result of the sentence;
    wherein the transformation of the feature vector $\vec{b}$ into the image set comprises:
    generating a set of transform vectors $\{\vec{d}_i\}_{i=1}^{q}$, wherein $\vec{d}_i \in \mathbb{R}^n$, wherein the parameter i is a positive integer, the parameter n is a positive integer, and the parameter q represents the number of channels for the images; and
    computing $\{\vec{d}_i\}_{i=1}^{q}$ to obtain the image set I, wherein $I \in \mathbb{R}^{q \times m \times n}$.

2. The method of claim 1, wherein any two of the transform vectors are orthogonal to each other.

3. The method of claim 1, wherein the parameter q is dependent of a selected language and is set the same as the number of parts of speech of the selected language.

4. The method of claim 1, further comprising:
    modifying resolutions of the images by a modifier by varying at least one of the parameters m and n, wherein the inputting of the image set into the neural network to execute the image recognition is performed after the modifying the resolution of the images.

5. The method of claim 4, wherein the modifying the resolution of the images comprises:
    up-sampling each of the images by the modifier, such that the image set I becomes an up-sampled image set I' that satisfies $I' \in \mathbb{R}^{q \times m \times t}$, wherein the parameter t is a positive integer equal to or greater than the parameter n.

6. The method of claim 5, wherein the modifying the resolution of the images comprises:
    after the up-sampling, performing feature enhancement to the images by the modifier, such that the up-sampled image set I' becomes a feature-enhanced image set I" that satisfies $I'' \in \mathbb{R}^{q \times r \times s}$, wherein the parameter r is a positive integer different from the parameter m, and the parameter s is a positive integer different from the parameters n and t.

7. The method of claim 1, wherein the sentence is analyzed such that polarity of the sentence is classified to be either positive or negative.

8. The method of claim 7, further comprising:
    displaying a classified result by a displayer to show the polarity of the sentence is positive or negative.

9. The method of claim 7, further comprising:
    linking to the textual source storing a plurality of different comments by a director, so as to input the comments into the NLP-based feature extractor.

10. An apparatus for applying image encoding recognition to natural language processing (NLP), comprising:
    an NLP-based feature extractor configured to extract a sentence from a textual source, configured to generate a word vector in response to the sentence, and configured to convert the word vector into a feature vector $\vec{b}$, wherein the feature vector $\vec{b}$ satisfies $\vec{b} \in \mathbb{R}^m$ and the parameter m is a positive integer;

a transformer configured to transform the feature vector $\vec{b}$ into an image set having a plurality of two-dimensional images; and a processor configured to input the image set into a neural network to perform image recognition on the image set to generate an analytical result of the sentence;

wherein the transformer is further configured to generate a set of transform vectors $\{\vec{d}_i\}_{i=1}^{q}$ wherein $\vec{d}_i \in \mathbb{R}^n$, the parameter i is a positive integer, the parameter n is a positive integer, and the parameter q represents the number of channels for the images, wherein the transformer is further configured to compute $I=[\vec{b}\vec{d}_1^T, \vec{b}\vec{d}_2^T, \ldots, \vec{b}\vec{d}_q^T]$ to obtain the image set I, wherein $I \in \mathbb{R}^{q \times m \times n}$.

11. The apparatus of claim 10, wherein any two of the transform vectors are orthogonal to each other.

12. The apparatus of claim 10, wherein the parameter q is dependent of a selected language and is set the same as the number of parts of speech of the selected language.

13. The apparatus of claim 10, further comprising:
a modifier configured to modify resolution of the images by varying at least one of the parameters m and n.

14. The apparatus of claim 13, wherein the modifier is further configured to up-sample each of the images such that the image set I becomes an up-sampled image set I' that satisfies $I' \in \mathbb{R}^{q \times m \times t}$, and the parameter t is a positive integer equal to or greater than the parameter n.

15. The apparatus of claim 14, wherein the modifier is further configured to perform a feature enhancement to the images, such that the up-sampled image set I' becomes a feature-enhanced image set I" that satisfies $I'' \in \mathbb{R}^{q \times r \times s}$, the parameter r is a positive integer different from the parameter m, and the parameter s is a positive integer different from the parameters n and t.

16. The apparatus of claim 10, wherein the processor is further configured to analyze the sentence such that polarity of the sentence is classified to be either positive or negative.

17. The apparatus of claim 16, further comprising:
a displayer configured to display a classified result to show the polarity of the sentence is positive or negative.

18. The apparatus of claim 16, further comprising:
a director configured to link to the textual source storing a plurality of different comments, so as to input the comments into the NLP-based feature extractor.

* * * * *